June 9, 1931.  J. VAN VORST  1,809,003
TRAILER WHEEL LOCK
Filed April 14, 1930
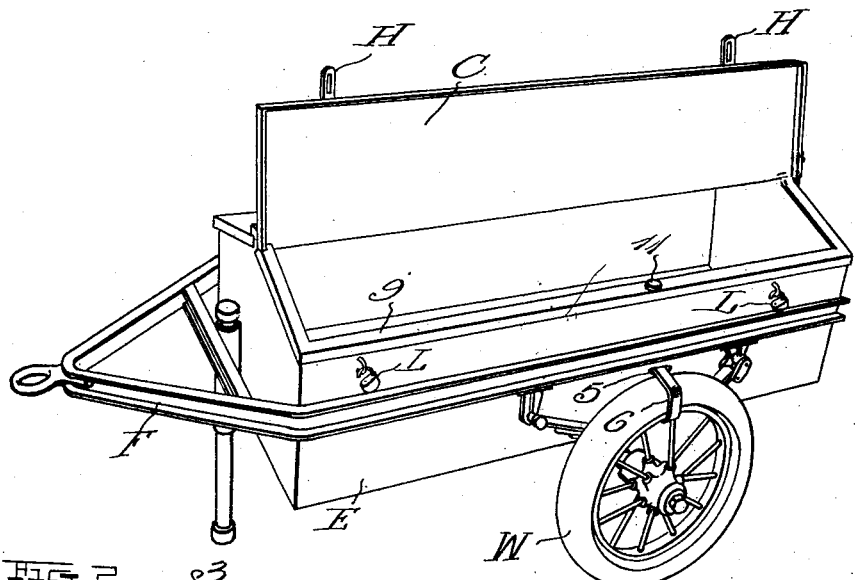
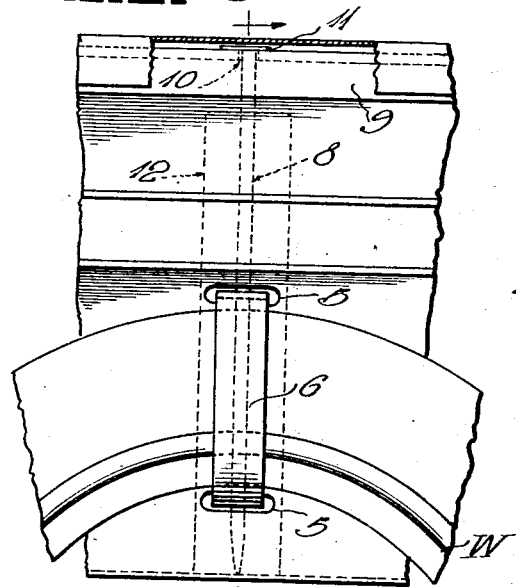
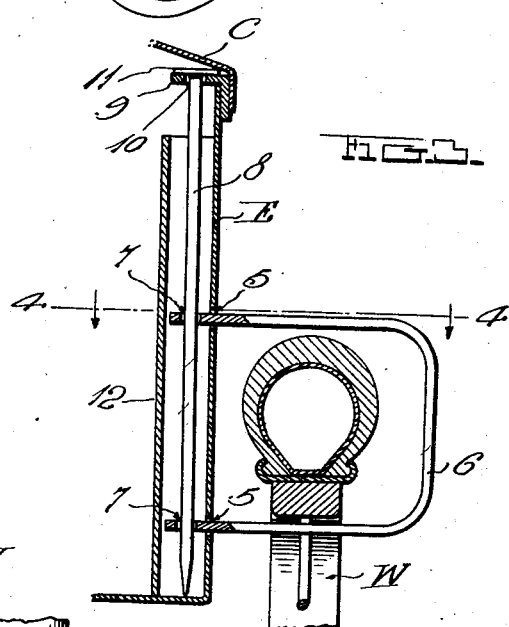
Witness
H. Woodard
Inventor
John Van Vorst
By H. B. Willson & Co.
Attorneys Patented June 9, 1931

1,809,003

UNITED STATES PATENT OFFICE

JOHN VAN VORST, OF SCHENECTADY, NEW YORK, ASSIGNOR TO MOHAWK ASPHALT HEATER COMPANY, OF SCHENECTADY, NEW YORK, A COPARTNERSHIP COMPOSED OF JOHN VAN VORST AND GEORGE M. BAKER

TRAILER WHEEL LOCK

Application filed April 14, 1930. Serial No. 444,238.

The invention relates to trailers such as those used by linemen for carrying tools and equipment, and it aims to provide a new and improved means for locking at least one wheel when the trailer is standing idle, so that it cannot be moved by unauthorized persons.

With the foregoing in view, the invention resides in the novel subject matter hereinafter described and claimed, description being accomplished by reference to the accompanying drawings.

Fig. 1 is a perspective view of a trailer embodying my invention.

Fig. 2 is a fragmentary side elevation partly broken away and in section.

Fig. 3 is a vertical transverse sectional view on line 3—3 of Fig. 2.

Fig. 4 is a detail horizontal sectional view on line 4—4 of Fig. 3.

A trailer is shown embodying a frame F supported by wheels W and carrying a tool box or other enclosure E, the latter being provided with a hinged cover C. Any appropriate means such as the hasps H and padlocks L, may be employed for locking this cover closed, and my invention is such that it cannot be released until the cover is opened.

One side wall of the enclosure E is provided with two slots 5 which are spaced inwardly from the upper portion of the wheel W, and a U-shaped wheelholding yoke 6 is provided to embrace the upper portion of said wheel, the ends of said yoke being insertible through the slots 5 and being provided with openings 7. A vertical locking rod 8 is downwardly insertible through the openings 7 to hold the yoke 6 against withdrawal from the slots 5, and as long as the cover C is closed, this rod is inaccessible. It is hence impossible to unlock the wheel without first unlocking and raising the cover.

In the present showing, the upper edges of the side and end walls of the enclosure E, are reinforced by angle metal bars having inwardly projecting flanges 9, one of these flanges being formed with an opening 10 through which the rod 8 passes, said rod preferably having a flat head 11 lying upon said flange. When the cover is raised, this head 11 may readily be grasped by the fingers and hence rod 8 may be readily withdrawn, allowing removal of the yoke 6, both rod and yoke being then placed in the enclosure until further use is required.

Preferably, a vertically disposed channel bar 12 is welded or otherwise secured against the inner side of the slotted side wall of the enclosure E, said channel bar being positioned to receive the rod 8 and the inner ends of the yoke 6. This bar 12 prevents any contents of the enclosure E, from shifting to positions which would interfere with insertion or removal of the rod 8 and the ends of of the yoke 6, and said bar also reinforces the side wall of the enclosure against injury in case anyone should attempt to forcibly withdraw the yoke 6 from the slots 5, for instance with the aid of a crow-bar or the like.

It will be seen from the foregoing that rather simple and inexpensive, yet efficient and desirable provision has been made for carrying out the object of the invention. The details disclosed are preferably followed, but within the scope of the invention as claimed, variations may be made.

I claim:

1. In a vehicle having an enclosure, and a wheel spaced laterally therefrom, said enclosure having an opening near said wheel; a wheel-holding member adapted for engagement with said wheel and for passage through said opening, and means within said enclosure for locking said wheel-holding member against withdrawal from said opening.

2. In a vehicle having an enclosure and a wheel spaced laterally from said enclosure, the latter being formed with two openings near the wheel; a U-shaped yoke adapted to straddle a portion of the wheel and to have its ends passed through said opening, said yoke ends being formed with alined openings, and a rod adapted for passage through these openings at the interior of the enclosure to hold said yoke ends against withdrawal from the first named openings.

3. In a wheeled vehicle having an enclosure provided with a movable closure, and means for locking said closure; locking means for a wheel of the vehicle, said locking means having a releasing portion to which access is barred by said closure while the latter is locked.

4. In a vehicle, an enclosure having a vertical side wall provided with an opening, a wheel spaced outwardly from said wall, a wheel-holding member engageable with said wheel and having an apertured portion insertible through said opening, a vertical rod downwardly insertible through the aperture of said wheel-holding member at the inner side of said wall, a cover for said enclosure downwardly swingable over said rod, and locking means for said cover.

5. In a vehicle, an enclosure having a vertical side wall provided with an inwardly projecting flange at its upper edge and with an opening below said flange, a wheel spaced outwardly from said wall, a wheel-holding member engageable with said wheel and having a portion insertible through said opening, said portion and said flange having vertically alined openings, a vertical rod downwardly insertible through said alined openings at the inner side of said wall, a cover for said enclosure downwardly swingable over said rod, and means for locking said cover.

6. A structure as specified in claim 4; together with a vertical channel bar secured against the inner side of said side wall to receive said rod, preventing any contents of the enclosure from moving into positions to interfere with rod insertion and removal.

In testimony whereof I affix my signature.

JOHN VAN VORST.